(12) United States Patent
Zipperer et al.

(10) Patent No.: US 10,581,728 B1
(45) Date of Patent: Mar. 3, 2020

(54) RATE LIMITING OF NETWORK TRAFFIC

(71) Applicant: Amazon Technologies, Inc., Reno, NV (US)

(72) Inventors: Joseph Paul Zipperer, Seattle, WA (US); Andrew Bruce Dickinson, Seattle, WA (US); Kirk Arlo Petersen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/033,157

(22) Filed: Sep. 20, 2013

(51) Int. Cl.
*H04L 12/721* (2013.01)
*H04L 29/06* (2006.01)

(52) U.S. Cl.
CPC .............. *H04L 45/38* (2013.01); *H04L 45/32* (2013.01); *H04L 63/1458* (2013.01)

(58) Field of Classification Search
None
See application file for complete search history.

(56) References Cited

U.S. PATENT DOCUMENTS

| | | | | |
|---|---|---|---|---|
| 7,453,804 | B1* | 11/2008 | Feroz | H04L 12/5693 370/229 |
| 8,295,174 | B2* | 10/2012 | Wu | H04L 47/10 370/233 |
| 9,342,339 | B2* | 5/2016 | Kanda | H04L 47/10 |
| 2002/0141379 | A1* | 10/2002 | Davari | H04L 49/255 370/351 |
| 2003/0232624 | A1* | 12/2003 | Toskala | H04W 28/22 455/509 |
| 2004/0158626 | A1* | 8/2004 | Douglas | H04L 65/4092 709/224 |
| 2006/0227758 | A1* | 10/2006 | Rana | H04L 45/04 370/351 |
| 2010/0005465 | A1* | 1/2010 | Kawato | G06F 9/455 718/1 |
| 2010/0278191 | A1* | 11/2010 | Gupta | H04L 47/323 370/419 |
| 2010/0290485 | A1* | 11/2010 | Martini et al. | 370/477 |
| 2011/0197274 | A1* | 8/2011 | Callon et al. | 726/22 |
| 2013/0294236 | A1* | 11/2013 | Beheshti-Zavareh et al. | 370/235 |
| 2015/0040121 | A1* | 2/2015 | Barabash | G06F 9/45558 718/1 |
| 2015/0058474 | A1* | 2/2015 | Bloom et al. | 709/224 |

OTHER PUBLICATIONS

Kirsch et al., "Less Hashing, Same Performance: Building a Better Bloom Filter," In Proc. of the 14th Annual European Symposium on Algorithms (ESA), 2006, pp. 456-467, Zurich, Switzerland.

* cited by examiner

*Primary Examiner* — Ajit Patel
*Assistant Examiner* — Richard Schnell
(74) *Attorney, Agent, or Firm* — Davis Wright Tremaine LLP (57) ABSTRACT

A method and apparatus for rate limiting network traffic are provided. A plurality of network devices may receive network traffic and route the network traffic to a destination. Rate limits may be imposed on the output rate of the plurality of network devices. The rate limits may be adjusted as the flow of the network traffic changes.

25 Claims, 8 Drawing Sheets

RATE LIMITING OF NETWORK TRAFFIC

BACKGROUND

Intermediary network devices, such as routers, may be utilized to route network traffic directed to destination devices, including servers, databases and the like. Each intermediary network device may receive traffic from one or more networks and may direct the traffic to a plurality of destination devices. The rate at which network traffic is received by the intermediary devices network may fluctuate and change over time and the change may not be consistent across all the intermediary devices. If the intermediary devices are permitted to send the received traffic to a destination device without imposing rate control, the destination device may sometimes be overwhelmed or "flooded" with the network traffic. To guard against overwhelming the network device, some networks employ equal allocation of rate control for all intermediary devices. In the equal allocation, the permitted data rate for all intermediary devices is the same, whereby, for example, for a destination device that accepts data at a rate of 1 gigabits per second (Gbps), five intermediary devices may be permitted to send data at a maximum rate of 200 megabits per second (Mbps). Equal allocation may an acceptable remedy in scenarios where the network traffic fluctuates substantially evenly across the intermediary devices. However, equal allocation fails to adaptively adjust the rate an intermediary device is permitted to send based on the rate of network traffic received by the intermediary device. Equal allocation has adverse effects on the flow of network when the change in network traffic across the intermediary devices is not uniform, for example, in the case where some intermediary device receive traffic at a rate that is much greater than the maximum rate, whereas other intermediary device receive traffic at a rate that is much less than the maximum rate. Further, equal allocation leads to unnecessary rate limiting, for example, when the total rate of traffic received by the intermediary devices is less than the rate at which the destination device accepts traffic but the received traffic is skewed such that one or more intermediary devices receive data at a rate higher than the allocated rate.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include rate limiting of network traffic provided by a router to a destination device. The router may be network any device or entity that is configured to receive data from a network, count the received data (for example, in bits, Bytes or packets) or count a rate at which data is received or impose a rate limit or a threshold on the amount of data the router provides to the destination device or the rate at which the router provides the data to the destination device. It is noted that although the term router is used herein to refer to a network device that is capable of measuring a traffic rate, routing data or imposing a rate limit on provided data, the term router is non-limited to Layer 3 devices or other devices typically classified as routers. Further, the router (network device) may be in any layer of a network. The destination device may be any entity that is configured to receive data or network traffic. The destination device may be equipped with computing capability and may process the data or, alternatively, the destination device may, in turn, route the data to another device in the same layer or a different layer in the network. As described in more detail below, while a destination device is used for illustration, the destination may correspond to multiple devices, such as multiple devices of a distributed system served by the routers. The distributed system that may comprise multiple devices with different Internet protocol (IP) addresses. For example, the destination may be two computers that collectively provide a service, whereby a portion of the traffic routed to the destination may be provided to the first computer and another portion of the traffic routed to the destination traffic may be routed to the second computer.

The router may be one of a plurality of routers and each router of the plurality of routers may receive traffic from the network that is intended to the destination device. The rate at which each router receives traffic from the network may fluctuate and change over time and the change may not be consistent across all routers. Each router may measure the data rate at which the router receives network traffic. Although reference is made to a data rate herein, it is noted that a data rate is interchangeable with an amount of data received, provided or observed in an interval of time. The router may send the data rate to a traffic rate manager. The traffic rate manager may be any device or entity that is equipped with a computing capability, such as a processing capability provided by a central processing unit (CPU). The traffic rate manager may aggregate the plurality of data rates to yield an aggregate data rate. The aggregate data rate may represent the rate of data received by the routers and intended to the destination device. The traffic rate manager may compare the aggregate data rate with a desired data rate of the destination device in order to determine whether the amount data received by the routers per unit time and intended to the destination device is in excess of amount of desired data rate of the destination device. It is noted that as described herein, the desired data rate of the destination device may not be one at the limit of the capabilities of the destination device, but may be lower than the amount of data the destination device may process per unit time.

If the traffic rate manger determines that the aggregate is in excess of the desired data rate, the traffic rate manager may impose rate limiting on one or more routers of the plurality of routers. When rate limiting is imposed, the one or more routers may limit to a threshold the data that the one or more routers provide to the destination device. The determination to limit the data may be performed in order to guard against overwhelming the computing capabilities of the destination device. If the traffic rate manger determines to limit the data provided to the destination device, the traffic rate manger may calculate a threshold for each router. The threshold may be a maximum data rate in excess of which the router may not provide data to the destination device.

To determine the threshold, the traffic rate manger may calculate a percentage of the destination device's rate limit allocation to each router. For each router, the percentage may be calculated as the data rate at which the router receives traffic from the network divided by the aggregate data rate at which the plurality of routers receive traffic from the network. The percentage may be used to determine the threshold associated with each router, whereby the threshold may be determined as the product of the percentage and the rate limit of the destination device. The traffic rate manager may then send the threshold to each router and each router may use the threshold to impose a rate limit on the rate at which the router provides data to the destination device. If the router provides data to a plurality of destination devices, the threshold is calculated for each destination device, whereby the threshold associated with the destination devices may be different. If the rate at which the router receives traffic from the network exceeds the threshold, the router may store excess traffic in a buffer and provide the excess traffic to the destination at a later time in accordance with how the router processes buffered traffic. Alternatively, the router may drop the packets or opt not to store the packets if, for example, the buffer is full.

Accordingly, a router of a plurality of routers may receive incoming traffic comprising a plurality of data portions. Each data portion may be a part of the total traffic to the destination that is received by the router. A first portion of the plurality of data portions may be associated with a first data rate and a second portion may be associated with a second data rate. Due to a difference between the first data rate and the second data rate or difference in the rate at which one or more other routers of the plurality of routers receive traffic from the network, the router may provide, at a first time interval, the first portion at a first threshold and, at a second time interval, the second portion at a second threshold, where the first threshold and second threshold are able to differ from one another. Other routers of the plurality of routers may also receive other portions of the total traffic addressed to the destination and route the other portions to the destination at adjustable data rates.

Each router of a plurality of routers may receive traffic that is intended to a plurality of destination devices (or, generally, to a plurality of destinations where a destination may comprise multiple network endpoints). A destination device may correspond to a distributed computing environment and, for instance, may be a load balancer or another router, for example, a router through which traffic is directed to another tier of destination devices. The destination device may share a physical link or CPU compatibility with a number of other destination devices. Further, network traffic may be sent to multiple different network addresses, whereby each network address is associated with a device of a single service or, generally, each network address of which is part of a collection of network destinations through which the routers route traffic.

Each destination device of the plurality of destination devices may be a computing instance provisioned to provide computing capability or process service requests, among others. Each computing instance may be associated with a rate limit for received data from the plurality of routers and each router of the plurality of routers may limit the rate at which the router provides data to one or more computing instances of the plurality of computing instances. Each router may count the data intended to each computing instance and may provide the count to a traffic rate manager. The traffic rate manager may, in turn, be aware of the rate limit associated with each computing instance and may determine for each router the rate at which the router is to provide data to one or more computing instance of the plurality of computing instances.

Figure 1:
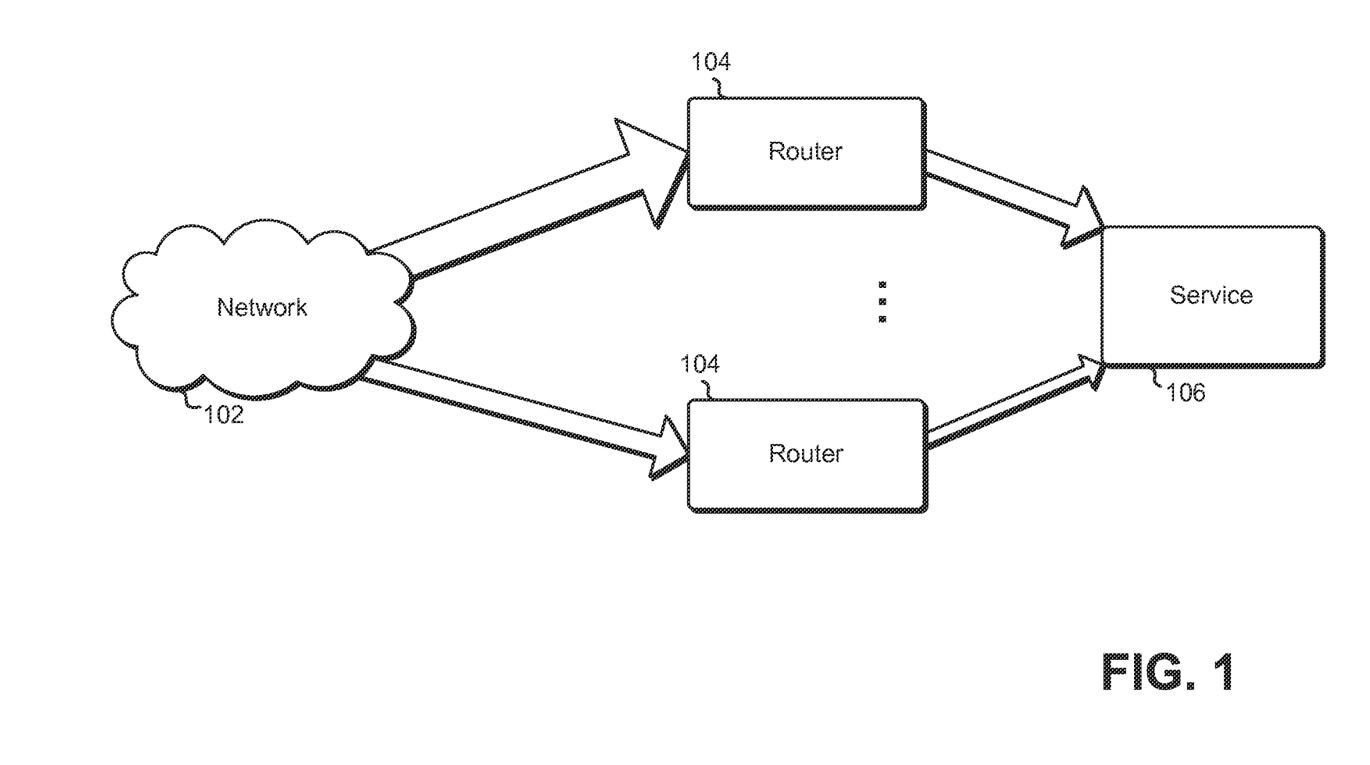
FIG. 1 shows an example of rate limiting of network traffic in accordance with at least one embodiment.

FIG. 1 shows an example of rate limiting of network traffic in accordance with at least one embodiment. A network 102, which may be the Internet, an intranet or an Internet service provider (ISP) network, among others, provides network traffic to a plurality of routers 104. The network traffic may be intended to a service 106 and the rate at which the data is provided to each router 104 by the network 102 to each router 104 may change based on a variety of factors. The network traffic may be addressed to the service 106 and may include an address corresponding to the service 106. As shown in FIG. 1, the width of the arrows leaving the network and arriving at the routers 104 are proportional to the data rate of the network traffic to each router 104. Due to the varying rate at which each router 104 receives traffic from the network 102, the router 104 may be used to regulate the traffic it sends to the service 106. Each router 104 may be used to impose limits on the rate at which data is provided to the service 106 and the limit may be adjusted as the traffic rate provided by the network 102 and received and observed by each router 104 changes. As shown in FIG. 1, due to the imposed rate limits, the width of the arrows leaving the routers 104 and arriving at the service are proportional to the rate of data provided by each router 104 to the service 106.

A router 104 may be any device or network entity that is capable of receiving data from the network 102 and counting or measuring the data or a rate at which the data is received. The router may be further capable of performing data routing functions and directing traffic to one or more device. In addition, a router 104 may be capable of performing a network address translation (NAT) function. Further, the router 104 may be capable imposing a limit on the rate at which the data is provided to the service 106. The router may provide a measurement of the received traffic from the network 102 to a network entity (not shown). The network entity may be capable of performing computing functions, for example, as enabled by any type of processor, such as a processor employing a central processing unit (CPU). The network entity may further determine whether to regulate the rate at which the data is provided to the service 106 and, if so, regulate traffic by imposing a limit on the rate of data provided by the routers. Further, the routers 104 may be in any network layer and the data provided by the routers may be sent to a different layer in the network, whereby the different layer may further comprise one or more routers configured to regulate data rates and impose any rate limits as necessary.

Figure 2:
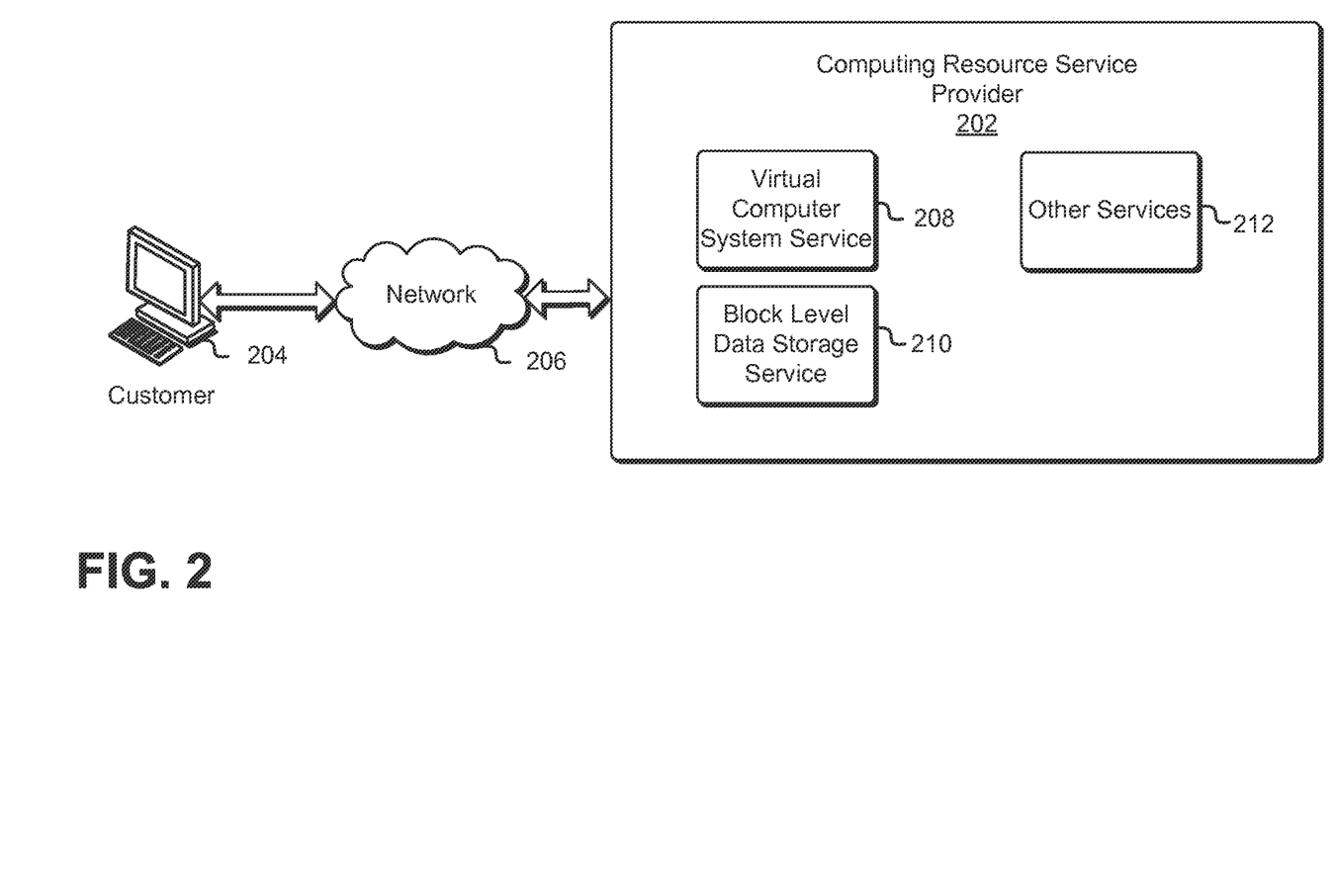
FIG. 2 shows a customer connected to a computing resource service provider offering a plurality of services in accordance with at least one embodiment.

FIG. 2 shows a customer connected to a computing resource service provider offering a plurality of services in accordance with at least one embodiment. The computing resource service provider 202 may provide a variety of services to the customer 204. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such the Internet, an intranet or an Internet service provider (ISP) network. Some communications from the customer 204 to the computing resource service provider 202 may cause the computing resource service provider 202 to operate in accordance with one or more embodiment described herein or a variation thereof.

The computing resource service provider 202 may provide various computing resource services to its customers. The services provided by the computing resource service provider 202, in this example, include a virtual computer system service 208, a block-level data storage service 210 and one or more other services 212. It is noted that not all embodiments described herein include the services 208-212 of the computing resource service provider 202 and additional services may be provided in addition to or as an alternative to services explicitly described herein. Each of the services may include one or more interfaces, such as web services interface, that enable the customer 204 to submit appropriately configured API calls to the various services through web service requests. In addition, each of the services may include one or more interfaces that enable the services to access each other.

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service 208 (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

Following provisioning, the virtual computer systems may receive network traffic via a plurality of routers (not shown in FIG. 2). The network traffic may include service requests, such as web service requests, that are sent to the virtual computer system for processing. As described herein, the routers may receive the network traffic at one rate and provide the network traffic or a portion thereof to the virtual computer system at a second rate. The rate at which each router of the plurality of routers receives network traffic and the rate at which the router provides the network traffic or a portion thereof to the virtual computer system may change over time.

The computing resource service provider 202 further includes a block-level data storage service 210. The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the virtual computer systems. A block-level storage device may enable the persistent storage of data used/generated by a corresponding virtual computer system where the virtual computer system service 208 may only provide ephemeral data storage.

Figure 3:
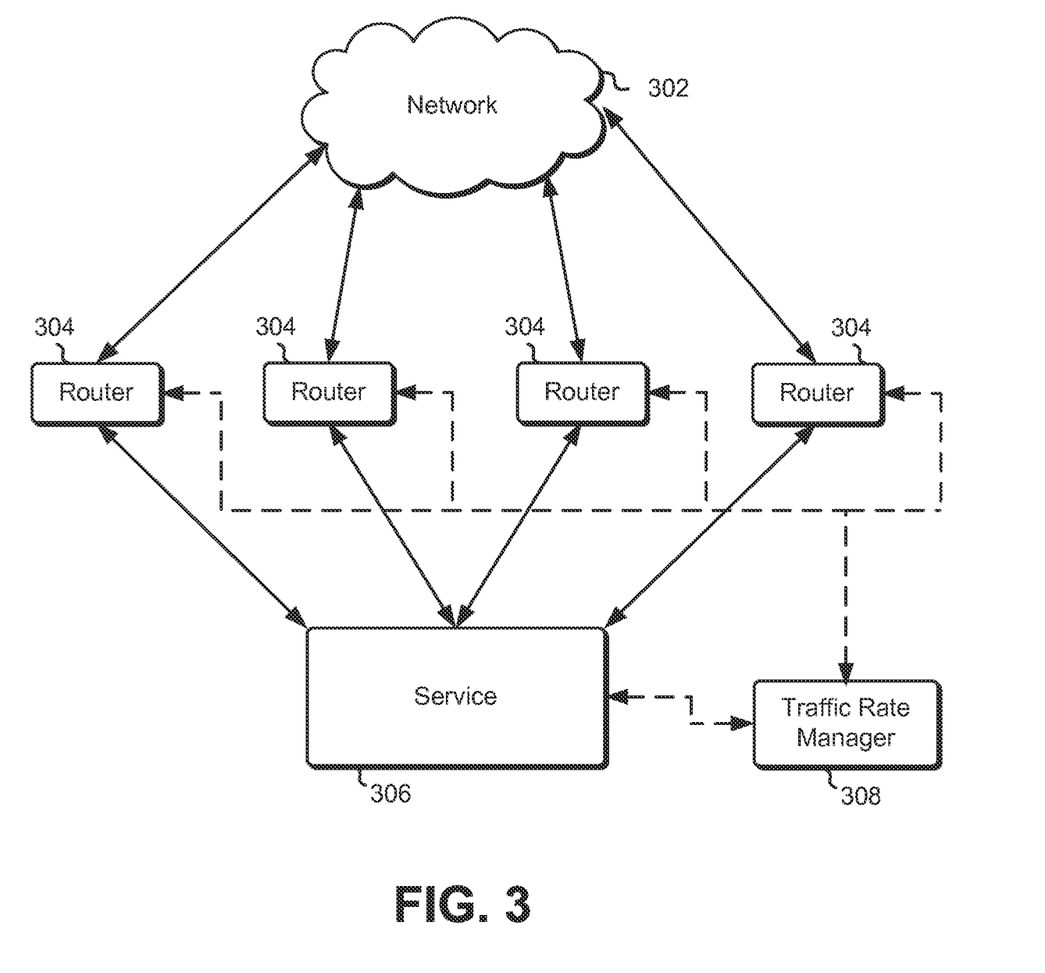
FIG. 3 shows an example of rate limiting network traffic in accordance with at least one embodiment.

FIG. 3 shows an example of rate limiting network traffic in accordance with at least one embodiment. A network 302, which may be the Internet, an intranet or an Internet Service Provider (ISP) network, among others, may provide network traffic to a plurality of routers 304 (singularly also referred to herein as router 304). The network traffic may include data received by the network from other devices or entities or data that originated from the network. The traffic may arrive at each of the routers 304 at a particular rate and the rate may be measured in bits, Bytes, packets per unit time or otherwise. The traffic arriving at each router 304 may be associated with a received traffic rate that represents the received traffic per unit time. The received network traffic may be destined for the service 306 and the received traffic may be provided by the router 304 to the service 306 at data rate (also referred to herein as a provided traffic rate).

The routers 304, or a subset of the routers 304, may be configured to implement a network traffic threshold, whereby the routers 304 may each be configured to provide traffic to the service 306 at particular rate not exceeding the network traffic threshold, for example, as measured in bits, Bytes or packets per unit time. The network traffic threshold may be a maximum rate that a router 304 is permitted to send or provide traffic to the service 306. The routers 304 may further be configured to count data received from the network in an interval of time and report a count of the received data or a rate associated with the received data to a traffic rate manager 308. The traffic rate manager 308 may receive the reported data counts from the routers 304 and may aggregate the reported data counts over the plurality of routers 304 that provide network traffic to the service 306.

The traffic rate manager 308 may compare the aggregated data counts with a desired data limit of the service 306 and may determine a network traffic threshold for each of the routers 304. The traffic rate manager 308 may send the network traffic threshold to its associated router 304 and each router 304 may then regulate the network traffic sent to the service 306 in accordance with the network traffic threshold. The router 304 may only send data to the service at a rate not exceeding that specified by the network traffic threshold. If network traffic arrives at the router at a rate that exceeds that permitted to be sent to the service 306 as dictated by the network traffic threshold, the router may temporarily store the excess data. The router 304 may be equipped with a buffer and the buffer may be used by the router 304 to store data awaiting sending to the service 306. The buffer may be implemented using any type of memory, such as static or dynamic memory. Further, the buffer may implement a queuing mechanism, whereby received data is associated with a priority. The priority of received data may be based upon the temporal arrival of the data at the router and earlier received data may be given priority over later received data. Alternatively, prioritization may be based upon other features associated with the received data. The size of the buffer may be limited and incoming traffic received from the network 302 may exceed the traffic threshold that is permitted to be sent by the router 304 to the service 306. In the event that the incoming traffic is received when the buffer is full, the buffer may be said to overflow and excess data (or packets of data) may be discarded by the router 304 when the router 304 does not have an associated buffer capacity to store the incoming traffic.

The traffic rate manager 308 may set the network traffic threshold associated with each router 304 so as to maximize the traffic received by the service 306. The traffic rate manager 308 may be aware of a desired data limit of the service 306. The data limit of the service 306 may represent the amount of data that the service 306 is capable of receiving or processing per unit time or the amount of data that the service 306 seeks to receive per unit time. Further, the traffic rate manager 308 may set the network traffic threshold for each router 304 so as to maximize the traffic received by the service 306 or minimize dropped or discarded data by the routers. The traffic rate threshold may be determined periodically, whereby the traffic rate manager 308 may be configured to receive traffic measurements from the routers 304 periodically. The traffic measurements may specify the amount of traffic each router 304 is receiving from the network 302. The traffic rate manager 308 may assess the network traffic threshold for each router 304 periodically and may determine to update the network traffic threshold or clear any existing network traffic thresholds so as to allow the routers 304 to send data to the service 306 with.

Figure 4:
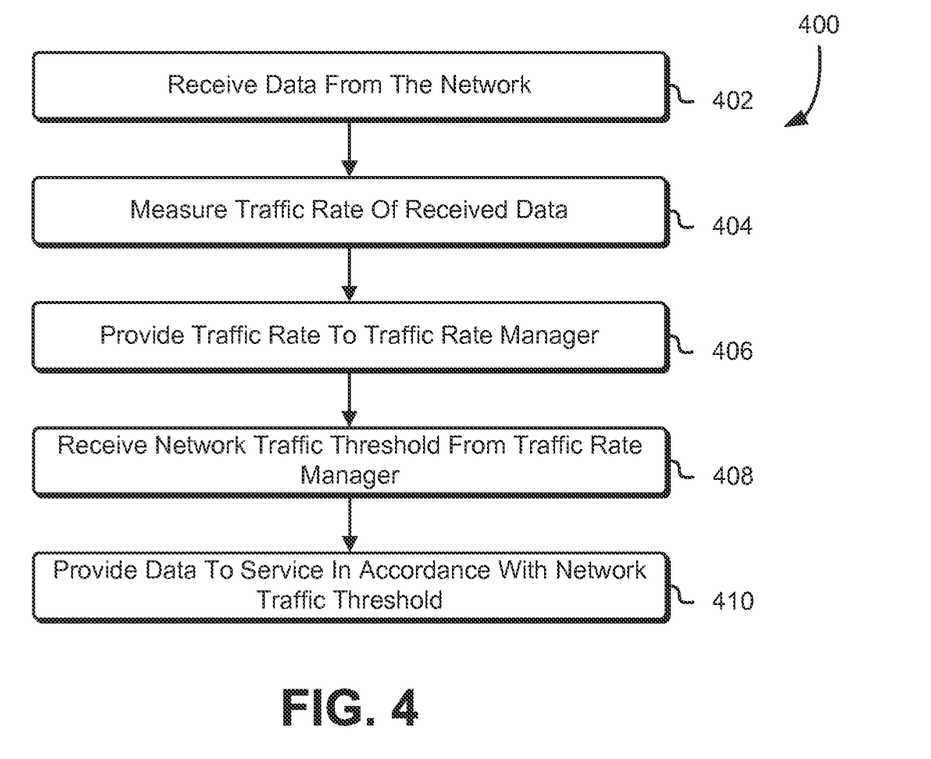
FIG. 4 shows an example of a method for setting network traffic rate in accordance with at least one embodiment.

FIG. 4 shows an example of a method for setting network traffic rate in accordance with at least one embodiment. In the process 400, a router receives 402 data from a network. The rate at which the data is received by the router may change over time. The router then measures 404 the traffic rate of the received data and provides 406 the measured rate to a traffic rate manager. The router may be configured to measure the traffic rate or provide the measured traffic rate to the traffic rate manager periodically or according to a set schedule. Alternatively, the router may be configured measure the traffic rate or provide the measured traffic rate to the traffic rate manager based at least on part on a trigger. The trigger may be a request to measure the traffic rate or provide the measured traffic rate to the traffic rate manager. As described herein, the request may be received from the traffic rate manager or the service. The request may be initiated due to the occurrence of an event or due to the satisfaction of a condition. The condition may be associated with a traffic rate that is received by a router, a service or any other entity. For example, the condition may be that the traffic rate received by a service exceeds a pre-defined limit. A trigger may conditional upon a specified amount of traffic being received (e.g., in bits, Bytes or packets) by a router or a service. The traffic received may be counted and upon the specified amount being received, the condition may be said to be satisfied and the trigger is initiated. The counter may be reset and the received traffic may be counted again. In this triggering scheme, traffic rates are updated more frequently in heavy traffic but less frequently in light traffic.

Upon providing the traffic rate to the traffic rate manager, the router receives 408 a network traffic threshold from the traffic rate manager. As described herein, the network traffic threshold may be a maximum rate for use by the router to provide data to the service. The router then provides 410 data to the service in accordance with the traffic threshold. The router may not provide data to the service at a rate higher than that specified by the network traffic threshold. It is noted that receiving data from the network, measuring a traffic rate of received data and providing data to a service in accordance with a network traffic threshold may each be performed by different network entities or devices. For example, a first network device may measure the traffic rate of received data whereas a second network device may provide data to a service in accordance with a network traffic threshold.

Because a router may receive data from the network at a faster rate than the router is able to output data to the service, the router may include or be equipped with a buffer for storing data that is awaiting to be sent to the service, as described with reference to FIG. 5

Figure 5:
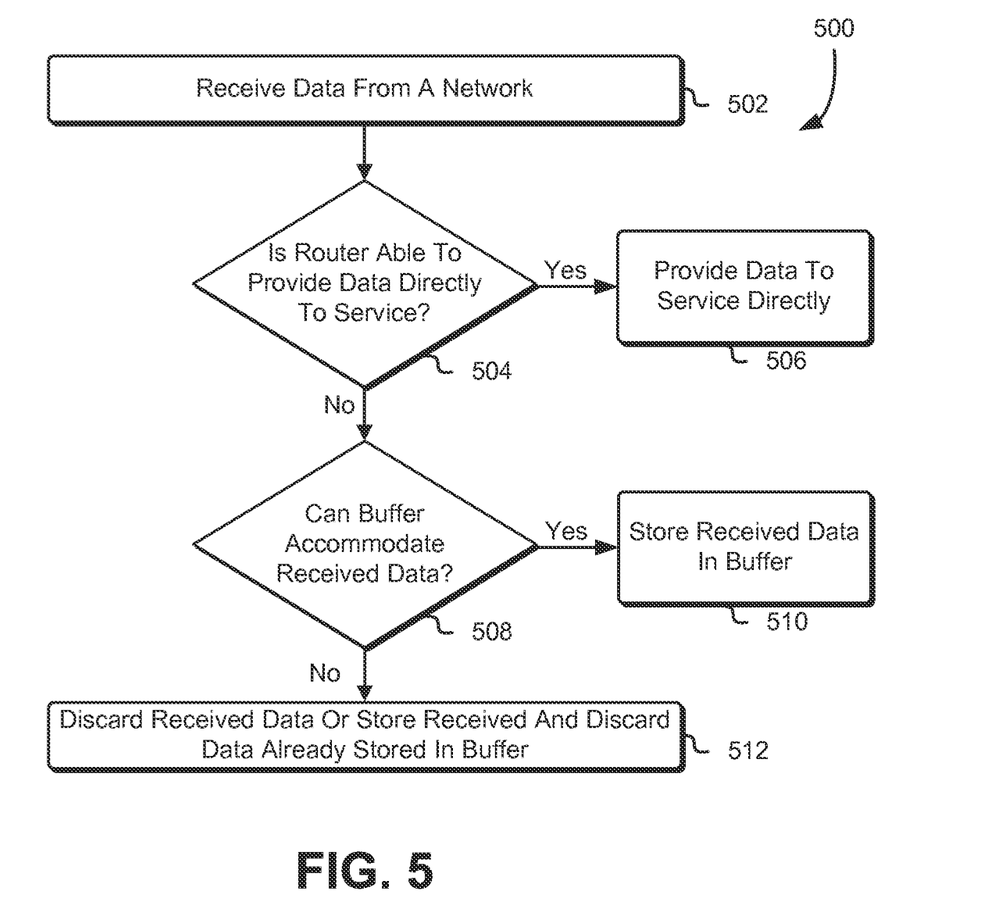
FIG. 5 shows an example of a method for buffering data by a router in accordance with at least one embodiment.

FIG. 5 shows an example of a method for buffering data by a router in accordance with at least one embodiment. In the process 500, a router receives 502 data from a network. The router then determines 504 whether the router is able to provide the data directly to a service (e.g., whether the router is able to provide the data without needing to buffer the data or if the router does not have queued traffic having a higher priority for sending to the service than the received data). The determination as to whether the router is able to provide the data directly to the service may be based on whether the network traffic threshold is sufficient enough for the router to provide the data to the service. Further, the determination may be based at least in part on whether the router stored data in an associated buffer and whether the data that is stored in the buffer is prioritized for transmission to the service. If the router determines that the network traffic threshold is sufficient enough for the received data to be provided to the service and the received data is associated with a higher priority for transmission to the service than any buffered data, the router provides 506 the data directly to the service and without needing to buffer the data. In some embodiments, data that the router is capable of providing directly to the service may buffered, whereby the buffering is due to the operation of the router and not due to an unavailability of bandwidth as a result of a rate limit imposed on the router.

If, on the other hand, a negative determination is made and the router is not able to provide the data directly to the service, the router determines 508 whether the buffer can accommodate the received data. Determining whether the router can accommodate received data may be based at least in part on whether the buffer has sufficient memory or storage capacity for storing the received data. If the router determines that the buffer can accommodate the received data, the router stores 510 the received data in the buffer. If a negative determination is made and the router determines that the buffer cannot accommodate the received data, the router discards 512 the received data or stores the received data and discards data that is already stored in the buffer. The router may discard the received data because the buffer does not have appropriate capacity to store the received data and because the data that is already stored in the buffer has priority for processing or transmission to the service over the received data. Furthermore, the buffer may discard the data already stored in the buffer and replace the discarded data with the received data if the received data is deemed to have priority for transmission or a priority for processing over the received data.

As described herein, a rate limit may be apportioned to each of the plurality of routers if the routers are capable of sending data to the service at a rate higher than that desired by the service. The desired rate of the service may be due to subscription limitations of the service and may be set in accordance with the capabilities of the service for processing data or may be consistent with the resources allocated to the service for performing computing functions. Further, the rate limit may be apportioned to prevent or mitigate the effect of a denial-of-service (DOS) attack or a distributed denial-of-service (DDOS) attack. DOS and DDOS attacks seek to provide a high volume of data or service requests to the service so as to "flood" the service and cause the service to be consumed with processing or handling the data or service requests. When the service is consumed with processing or handling attack data, the service is likely to be unresponsive to legitimate data and service requests. When the rate limit is apportioned, data that is sent from the routers to the service may be limited to a specified amount per unit time and the data may not overwhelm the service or its associated computing resources as to cause the service to be unavailable to legitimate traffic.

Figure 6:
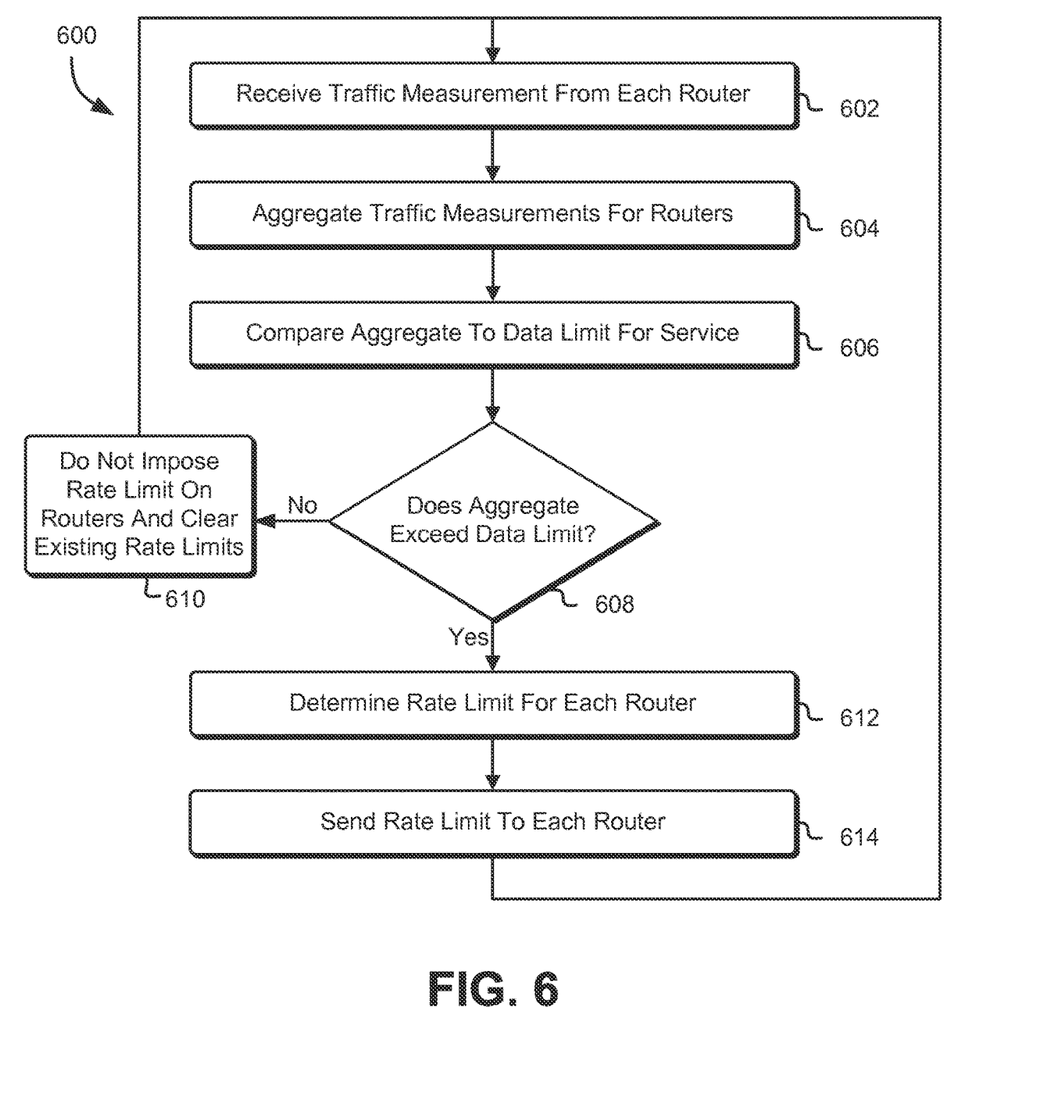
FIG. 6 shows an example of a method for rate limiting in accordance with at least one embodiment.

FIG. 6 shows an example of a method for rate limiting in accordance with at least one embodiment. In the process 600, a traffic rate manager, such as traffic rate manager 308 described with reference to FIG. 3, receives 602 traffic rate measurements from each router providing data to a service. The traffic rate measurements may be compiled by each router over an interval of time. Each router may also provide the interval of time over which the traffic was measured to the traffic rate manager. Traffic rate measurements may be provided as a rate (i.e., bits, Bytes or packets received per unit time) or the total amount of data received over the interval. Further, the router may identify the service for which the measured data is destined or intended, an Internet protocol (IP) address of the destination or a network address of the destination. The network address may be used when the destination is a different layer of the network, whereby, for example, the different layer may include routers that also impose rate limits. In addition, the router may provide an identity associated with the router. The identifying information may be useful to the traffic rate manager in instances where the router serves and provides data to a plurality of services and the traffic rate manager may seek to use the traffic rate measurements to impose data rate limits independently for each of the plurality of services. For example, a tuple received by the traffic rate manager may be: [router identity, destination IP address, traffic measurement, interval of time].

The traffic rate manager then aggregates 604 the traffic measurements for the routers associated with a service. Each of the routers may be configured to measure the traffic over the same interval of time and the traffic rate manager may aggregate the traffic measurements received by each of the routers over the interval of time. The aggregate or summation may be computed by one or more computing resource of the traffic rate manager or a cluster of computing resources may be used to calculate the aggregate using a distributed computing algorithm such as map reduce. The traffic rate manager may be aware of whether the service for which the measured data is destined has an associated rate limit for data received from the routers. The traffic rate manager then compares 606 the aggregated traffic measurement across the routers for the service with the service's rate limit and determines 608 whether the aggregated traffic measurement exceeds the limit of the service.

If a negative determination is made, the traffic rate manager may determine that the routers do not provide data to the service in excess of that desired by the service. Accordingly, the traffic rate manager imposes 610 a rate limit on the routers and clears any existing rate limits. The process 600 reverts to the traffic rate manager receiving 602 traffic measurements from each of the routers, which may be done periodically, according to a schedule or due to a trigger. If, on the other hand, the traffic rate manager determines that the aggregate of the data received by the routers and destined for the service exceeds the rate limit for the service, the traffic rate manager determines that imposing a rate limit on the routers is necessary. The traffic rate manager then determines 612 a rate limit for each of the routers. To determine the rate limit for each router, the measured traffic for the router may be divided by the aggregate across all routers to yield a percentage of the traffic limit of the service to be allocated to the router. The percentage may be then multiplied by the desired data limit or the desired rate limit for the service to yield the data limit or the data rate limit, respectively, for each router. The traffic rate manager then sends 614, to each router, the router's associated limit.

The process 600 may be performed on a time scale that is sufficiently short or brief such that changes in received traffic patterns for the routers are identified and the appropriate rate limits are imposed on the routers to control the rate of traffic received by the service. If the process 600 is short, the routers are equipped to quickly react to abrupt or fast changes in data rates received by the routers. If the total traffic measured by routers and destined to the service does not exceed the rate limit of the service, a rate limit is not apportioned to the routers and any existing or previously imposed rate limits are cleared. Accordingly, the routers may direct the received traffic to the service without applying a threshold or a limit.

Rate limiting may be performed periodically (for example, every millisecond (ms)) or due to a trigger. The trigger may be conditional upon the occurrence of an event. Rate limiting may be triggered if a router detects that the data received from the network is greater than a threshold or if the service detects that the data is received from one or more routers is greater than a threshold. For example, if the service detects that the rate of traffic received from associated routers is greater than 75% of the data rate limit of the service, the service may indicate to the traffic rate manager that the rate of traffic received from associated routers is greater than 75% of the data rate limit of the service and the traffic rate manager may initiate rate limiting. Similarly, the traffic rate manager may initiate rate limiting if the data rate received by a router is greater than a threshold. Upon initiating rate limiting, the traffic rate manager may request each router to report their received traffic rate and the traffic rate manager may apportion a rate limit to each router as described herein. Further, the traffic rate manager may manually initiate rate limiting to prevent DOS or DDOS attacks.

As described herein, a router may receive traffic from a network that is intended for a service. As used herein, a service includes any destination device or entity, such as a physical or virtual computer or computing instance. Furthermore, the service may include a plurality of entities and each entity of the plurality of entities may receive traffic from the routers. For example, the service may be a virtual computer system service, such as virtual computer system service 208 described with reference to FIG. 2, and the virtual computer system service may include a plurality of computing instance that are provisioned for providing computing services to one or more customers. Each computing instance may receive traffic from a plurality of routers independently of traffic received by other computing instances from the plurality of router as described with reference to FIG. 7.

Figure 7:
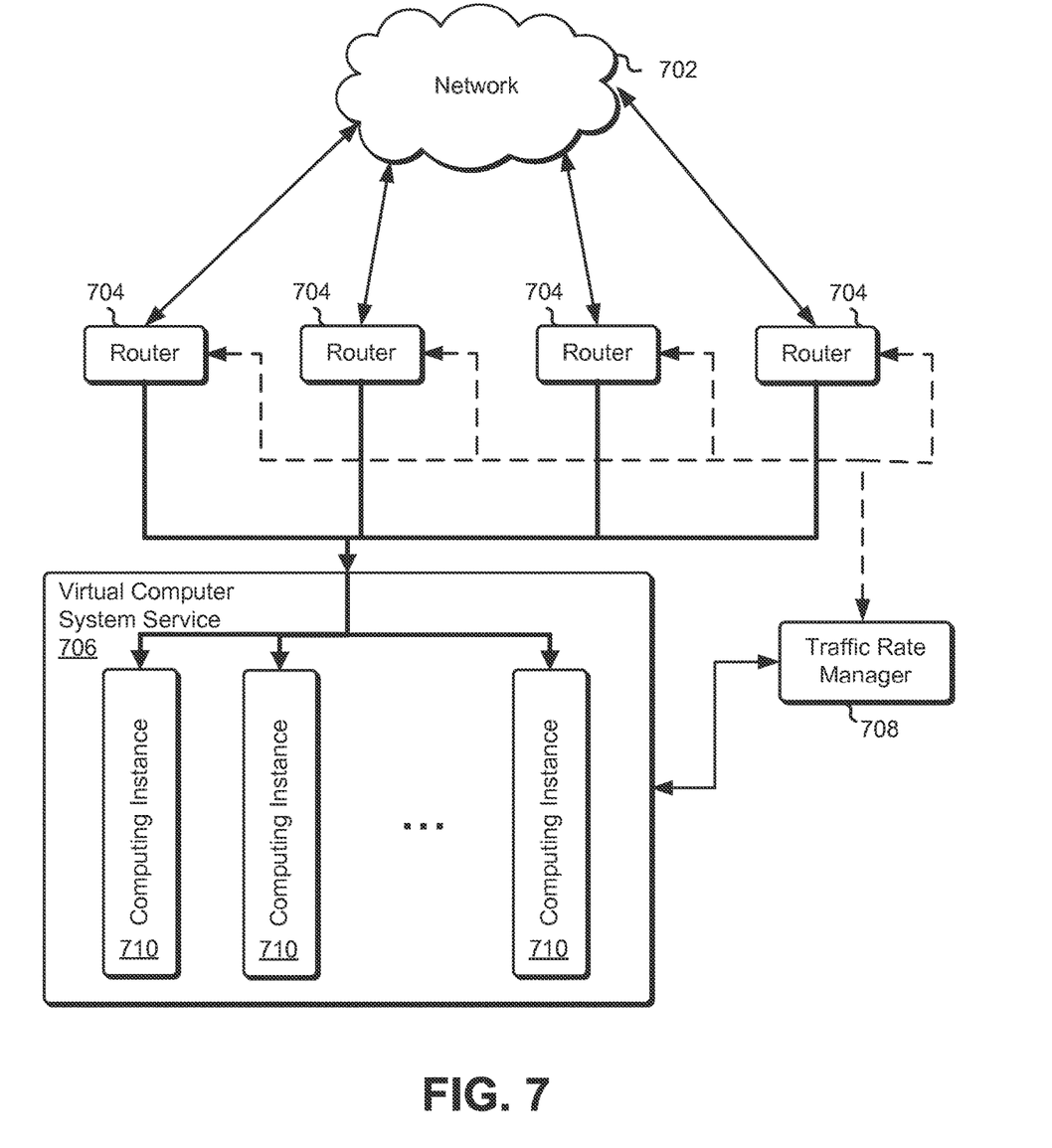
FIG. 7 shows an example of a virtual computer system service configured to receive network traffic in accordance with at least one embodiment.

FIG. 7 shows an example of a virtual computer system service configured to receive network traffic in accordance with at least one embodiment. The virtual computer system service 706 includes a plurality of computing instances 710 (singularly referred to herein as computing instance 710), whereby each of the plurality of computing instance 710 may be receive network traffic independently of other computing instances 710. A computing instance 710 may be associated with a destination address, such as an IP address, and data intended for the computing instance 710 may specify the destination address of the computing instance 710.

A plurality of routers 704 receive data intended to the plurality of computing instances 710 from a network 702. The data may identify a destination computing instance 710 using a network address (e.g., public IP address in embodiments where the Network is/includes a public communications network such as the Internet) associated with the computing instance 710. Each router 704 may further count the data intended to each computing instance 710 and report the count to a traffic rate manager 708. Each router may further queue or buffer data that is intended to each computing instance 710 as described herein. The router 704 may buffer data destined to a plurality of routers 704 independently for each router 704 or collectively for all routers 704. It is noted that some computing instances 710 of the virtual computer system service 706 may not be reachable from the network 702 due to a firewall or the computing instance 710 may not be allocated to associated a public IP address (for example, where the network is a public network). These computing instances may not receive traffic from the routers 704 unless by routing of other devices in a network with the computing instances, such as a router of a virtual private network.

The traffic rate manager 708 receives traffic measurements for each computing instance 710 from each of the plurality of routers 704 and aggregates the measurements for each computing instance 710 across routers 704. For each computing instance 710, the traffic rate manager 708 may determine whether a traffic rate limit is to be imposed. If the traffic rate manager 708 determines that a traffic rate limit is to be imposed, the traffic rate manger 708 determines, for each computing instance 710, a traffic rate for data sent to the computing instance 710 by each router of the plurality of routers 710. Determining the traffic rate for each computing instance may be performed in accordance with the method described with reference to FIG. 6.

In an embodiment, the virtual computer system service 706 may be associated with a maximum bandwidth for received data. The maximum bandwidth may dictate the total amount of data that may (e.g., due to physical limitations, programmed limitations, or otherwise) be received by the virtual computer system service 706 from the network 702 via the plurality of the routers 704. The maximum bandwidth may also be an upper bound on the total amount of data received by the computing instances 710 of the virtual computer system service 706, whereby the total amount of data rate received by the computing instances 710 may not exceed the maximum bandwidth.

To provision bandwidth for each of the computing instance 710, the virtual computer system service 706 may allocate its bandwidth evenly among of the computing instances 710, whereby, for example, a virtual computer system service 706 having a bandwidth of 20 gigabits per second (Gbps) and including 20 computing instances may allocate 1 Gbps to each computing instance 710. Typically, however, the computing instance 710 may not all utilize the entirety of their allocated bit rates and some of the bandwidth of the virtual computer system service 706 may be unused. Further, according to this scheme a first computing instance 710 requiring a bandwidth in excess of 1 Gbps may be deprived of receiving the extra bandwidth while a second computing instance 710 may be allocated unused bandwidth. It is noted that examples described herein are for illustrative purposes and the number computing instances and their associated bandwidth may vary greatly in accordance with various embodiments.

For improved efficiency, the total bandwidth allocated by the virtual computer system service 706 to its computing instance 710 may be greater than the maximum bandwidth of the virtual computer system service 706. As in the example above, the virtual computer system service 706 may allocate 2 Gbps to each of the computing instances 710 for a total of 40 Gbps of allocated bandwidth. The virtual computer system service 706 may periodically detect bandwidth utilization by the computing instances 710. If the bandwidth utilization exceeds the maximum bandwidth of the virtual computer system service 706, the virtual computer system service 706 may reduce the allocated bandwidth to one or more of the computing instances 710. The reduction of allocated bandwidth may not affect the computing instances 710 evenly, whereby, for example, only the bandwidth of computing instances 710 that utilize more than 1 Gbps of bandwidth may be reduced.

Although the embodiments described herein are described with reference to traffic or data received from a network (e.g., downlink data), the embodiments may also be utilized for sending data or traffic to a network (e.g., uplink data). For example, in an uplink scenario, a router receiving data from a source device, such as a service or a computing instance, may limit the rate at which the router provides the received data to a network. The rate may be limited in accordance with embodiments described herein based at least in part on the rate at which other routers receive data from the source device and the rate at which the network seeks to receive data.

Furthermore, receiving traffic rate measurements and determining rate limits for a plurality of routers may be performed by entities or functional units other than the traffic rate manager described with reference to numeral 308 in FIG. 3 or numeral 708 in FIG. 7. In an embodiment, a service or a computing instance of a service may be utilized for receiving traffic rate measurements and determining rate limits. For example, a computing instance 710 may be tasked with determining a rate limit for data received by the instance from routers 704. The computing instance may receive traffic rate measurements from a plurality of routers, whereby a traffic rate measurement may be received in-band with incoming data from a router. The computing instance 710 may allocate computing resources for processing the received traffic rate measurements and, if necessary, determining a rate limit on data received from the routers.

In alternative embodiments, distributed processing by routers may be used for determining rate limits for the routers. In distributed processing, each router may send traffic rate measurements to the remaining routers in a fleet. Each router may be tasked with performing rate limit computations based on the received measurements and may determine based on the received measurements whether a rate limit should be imposed. If the router determines that a rate limit should be imposed, the router may calculate a rate limit and may regulate the rate at which it provides data to the service or to a computing instance in accordance with the calculated rate limit.

When a router provides data to a plurality of services or destination addresses, the rate limit for the services or destination addresses may be indicated to the router using data structures, such as Bloom filters. A Bloom filter is a space-efficient data structure for representing a set to support membership queries. A Bloom filter may be tested to determine whether an element is a member of the set. A router may efficiently receive rate limits for the services or destination addresses using data structures, such as the Bloom filters. For example, three Bloom filters may be received by the router, whereby a first Bloom filter represents services or destination addresses whose data rate is greater than 500 megabit per second (Mbps), a second Bloom filter represents services or destination addresses whose data rate is between 200 and 500 Mbps and third Bloom filter represents services or destination addresses whose data rate is less than 200 Mbps. A router may determine the range of data rates for each service or destination address by testing the identities of the services or destination addresses in the Bloom filters. The router may then provide data to the plurality of services or destination addresses in accordance with the data rate provided by the Bloom filter.

It is noted that the embodiments described herein may be utilized to perform rate limiting on a fleet of routers in any network layer. Further, although in the embodiments described herein data is provided by the routers to a service, in alternative embodiments the data may be provided to other functional entities or routers in other layers of the network.

Figure 8:
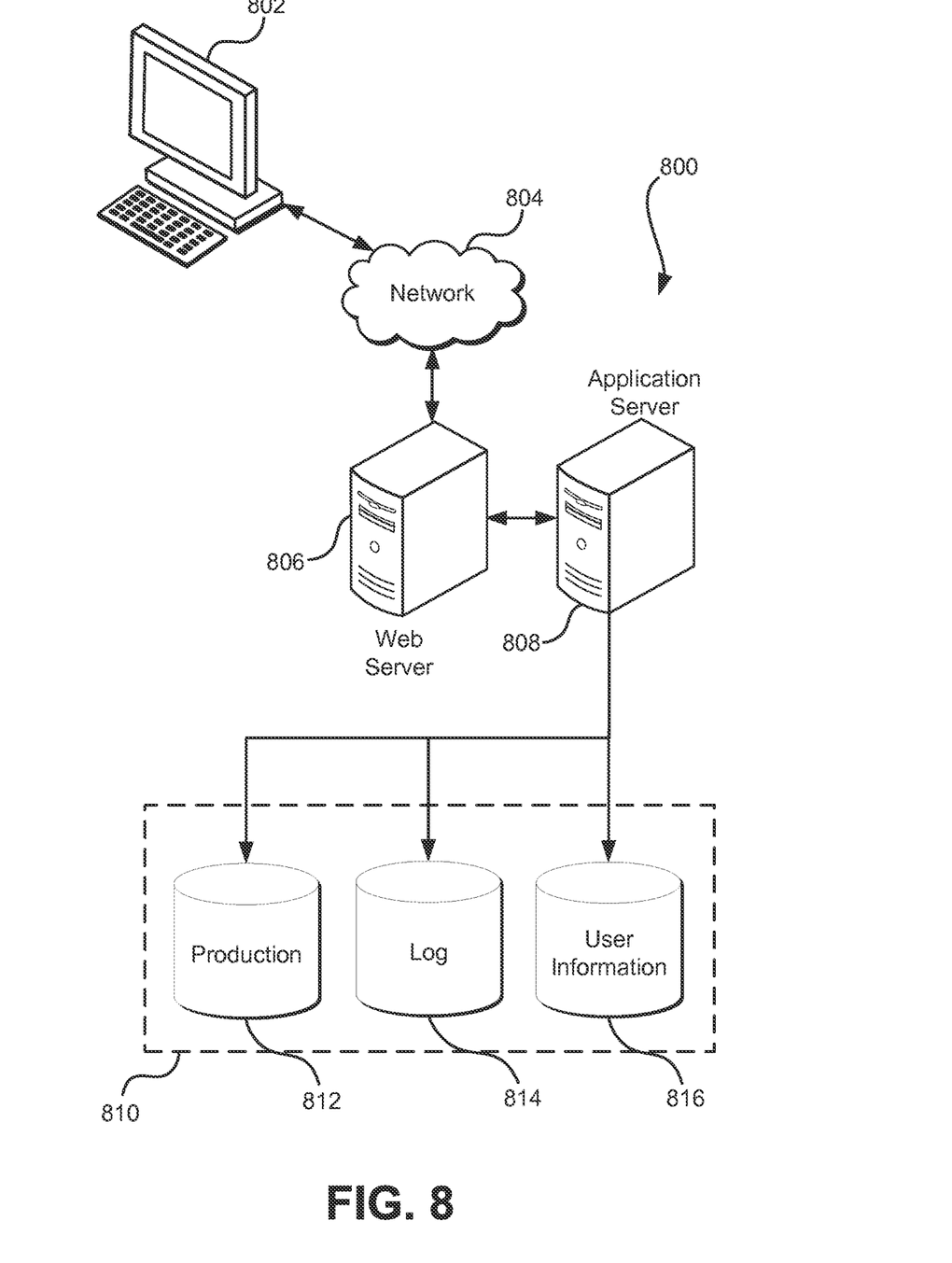
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 802 and the application server 808, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 810 can include several separate data tables, databases or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. One or more non-transitory computer-readable storage media having collectively stored thereon instructions that, as a result of execution by one or more processors of a system, cause the system to:
   receive one or more traffic rate measurements from a plurality of network devices, individual traffic rate measurements of the one or more traffic rate measurements specifying a rate at which traffic is directed by an individual network device to an individual virtual machine instance of one or more virtual machine instances of a destination service, total traffic directed by the plurality of network devices to the individual virtual machine instance being limited to a first threshold;
   aggregate the one or more traffic rate measurements to produce an aggregate traffic rate;
   compare the aggregate traffic rate to a bandwidth limit associated with the destination service; and
   as a result of the aggregate traffic rate exceeding the bandwidth limit:
   determine a second threshold different from the first threshold based at least in part on:
   the individual traffic rate measurements,
   the bandwidth limit associated with the destination service, and
   the aggregated traffic rate; and
   cause the total traffic directed by the plurality of network devices to the individual virtual machine instance of the one or more virtual machine instances to be limited to the second threshold.

2. The one or more non-transitory computer-readable storage media of claim 1, further comprising, on a condition that the aggregate traffic rate does not exceed the bandwidth limit associated with the destination service, cause the second threshold to be cleared.

3. The one or more non-transitory computer-readable storage media of claim 1, wherein:
   the destination service comprises a plurality of computing instances;

the traffic received by each network device of the plurality of network devices is addressed to one or more virtual machine instances of the plurality of computing instances; and the instructions that cause the total traffic to be limited further cause the rate at which each network device provides data to the destination service to be limited is performed per computing instance of the plurality of computing instances.

4. The one or more non-transitory computer-readable storage media of claim 1, wherein:

the destination service comprises a plurality of computing instances;

causing the rate at which the individual network device provides data to the destination service to be limited is performed by a computing instance of the plurality of computing instances; and the one or more traffic rate measurements are received, by the computing instance of the plurality of computing instances, from the plurality of network devices in-band with received data.

5. The one or more non-transitory computer-readable storage media of claim 1, wherein:

the one or more traffic rate measurements are received due to an occurrence of a trigger; and the trigger is an indication from the destination service that the aggregate traffic rate received from the plurality of network devices exceeded a pre-defined limit.

6. The one or more non-transitory computer-readable storage media of claim 1, wherein on a condition that a traffic rate measurement of a network device is greater than the second threshold allocated to the network device, the network device buffers some or all of the traffic received.

7. The one or more non-transitory computer-readable storage media of claim 1, wherein:

the destination service comprises a plurality of computing instances; and the instructions that cause the total traffic to be limited further cause the rate at which the individual network device provides data to each of the plurality of computing instances to be limited to a third threshold includes receiving one or more data structures, each data structure of the one or more data structures indicating a set of computing instances of the plurality of computing instances, the set of computing instances having a fourth threshold that falls within a range of thresholds specified by the data structure.

8. The one or more non-transitory computer-readable storage media of claim 1, wherein the bandwidth limit associated with the destination service is imposed to mitigate an effect of a denial-of-service (DOS) attack.

9. A system, comprising:

a plurality of network devices with one or more processors and memory that collectively route data to a destination, each network device of the plurality of network devices configured to:

receive network traffic and provide the network traffic directed by an individual network device to an individual virtual machine instance to the destination at an output rate, a sum of output rates of the plurality of network devices not exceeding a desired rate limit of the destination; and a traffic rate manager with one or more processors and memory that:

for each network device of the plurality of network devices, determines the output rate and, after determining the output rate, adjusts the output rate, the output rate being adjusted by:

on a condition that the sum of the output rates reach a first value relative to the desired rate limit, adjusting the output rate in accordance with a first threshold; and on a condition that the sum of the output rates reach a second value relative to the desired rate limit, adjusting the output rate in accordance with a second threshold different from the first threshold, the second threshold determined based at least in part on:

the sum of the output rates, the desired rate limit; and a bandwidth limit.

10. The system of claim 9, wherein, for each network device of the plurality of network devices, the output rate is based at least in part on a rate at which network traffic is received by the network device, the desired rate limit of the destination and a sum of a rate at which network traffic is received by each of the plurality of network devices.

11. The system of claim 9, wherein the traffic rate manager, residing outside of a communications path of the plurality of network devices of the plurality of network devices and the destination, is further configured to:

receive, from each network device of at least a subset of the plurality of network devices, an indication of a rate at which network traffic is received by the network device;

provide the output rate to each network device of at least the subset of the plurality of network devices; and limit network traffic rate from each network device of at least the subset of the plurality of network devices individually addressed to have different rate limits of each network device of at least the subset of the plurality of network devices for the destination.

12. The system of claim 11, wherein:

the traffic rate manager is further configured to request from each network device of at least the subset of the plurality of network devices the indication of the rate at which network traffic is received by the network device; and a request is triggered due to the destination reporting that a rate of traffic received by the destination exceeds a pre-defined limit.

13. The system of claim 9, wherein the desired rate limit of the destination is set as a result of detecting a denial of service attack.

14. The system of claim 9, wherein adjusting the output rate is triggered based at least in part on a rate at which network traffic is received by one or more network devices of the plurality of network devices exceeding a pre-defined limit.

15. The system of claim 9, wherein each network device of the plurality of network devices is further configured to, on a condition that a rate at which network traffic is received by the network device is greater than the output rate, temporarily store at least some of the network traffic received in a buffer.

16. The system of claim 9, wherein each network device of the plurality of network devices is further configured to, on a condition that the sum of the output rates at which network traffic is received by the plurality of network devices does not exceed the desired rate limit of the destination, provide the network traffic received to the destination without imposing a rate limit.

17. A computer-implemented method, comprising:
receiving one or more traffic rate measurements from a plurality of network devices, individual traffic rate measurements of the one or more traffic rate measurements specifying a rate at which traffic is directed by an individual network device to an individual virtual machine instance of one or more virtual machine instances of a destination service, total traffic directed by the plurality of network devices to the individual virtual machine instance being limited to a first threshold;
aggregating the one or more traffic rate measurements to produce an aggregate traffic rate;
comparing the aggregate traffic rate to a bandwidth limit associated with the destination service; and
as a result of the aggregate traffic rate exceeding the bandwidth limit:
determining a second threshold different from the first threshold based at least in part on:
the individual traffic rate measurements,
the bandwidth limit associated with the destination service, and
the aggregated traffic rate; and
causing the total traffic directed by the plurality of network devices to the individual virtual machine instance of the one or more virtual machine instances to be limited to the second threshold.

18. The computer-implemented method of claim 17, wherein the first threshold is based at least in part on a rate limit associated with a network address of the individual virtual machine instance.

19. The computer-implemented method of claim 17, wherein a difference between the second threshold and the first threshold is due at least in part to a change in one or more rates of incoming traffic received by one or more other network devices of the plurality of network devices.

20. The computer-implemented method of claim 19, further comprising receiving information indicating the second threshold from a traffic rate manager that detected the change.

21. The computer-implemented method of claim 17, wherein the second threshold is further calculated based at least in part on a sum of one or more rates of incoming traffic received by one or more other network devices of the plurality of network devices.

22. The computer-implemented method of claim 17, further comprising imposing the first threshold on the individual network device on a condition that a sum of a data rate associated with a first portion and one or more rates of incoming traffic received by one or more other network devices of the plurality of network devices is greater than a rate limit associated with the individual virtual machine instance.

23. The computer-implemented method of claim 17, wherein:
the individual virtual machine instance is a computing instance of a computing resource service provider;
the computing resource service provider has one or more other computing instances; and
the individual network device is configured to receive other incoming traffic destined to the one or more other computing instances and provide the other incoming traffic to the one or more other computing instances in accordance with one or more other rate limits.

24. The computer-implemented method of claim 17, further comprising:
measuring a data rate associated with the first portion to yield a data rate measurement of the first portion;
sending the data rate measurement of the first portion to a traffic rate manager; and
receiving the second threshold from the traffic rate manager.

25. The computer-implemented method of claim 17, further comprising, multiple times over a time interval:
measuring a data rate of received network traffic; and
transmitting the data rate to a traffic rate manager operable to cause the plurality of network devices to set new rate limits in accordance with received measured data rates.

* * * * *